| United States Patent [19] | [11] | Patent Number: | 4,886,864 |
|---|---|---|---|
| Foley, Jr. | [45] | Date of Patent: | Dec. 12, 1989 |

[54] SILYMETHYLENE METHACRYLATE CONTACT LENS AND POLYMER

[75] Inventor: William M. Foley, Jr., Glendale, Calif.

[73] Assignee: John D. McCarry, Santa Ana, Calif.

[21] Appl. No.: 246,419

[22] Filed: Sep. 19, 1988

Related U.S. Application Data

[60] Division of Ser. No. 61,477, Jun. 1, 1985, Pat. No. 4,780,516, Continuation-in-part of Ser. No. 742,122, Jun. 5, 1985, abandoned, Continuation-in-part of Ser. No. 641,594, Aug. 17, 1984, abandoned.

[51] Int. Cl.$^4$ .............................................. C08F 26/10
[52] U.S. Cl. .................................... 526/264; 526/279; 526/258; 351/160 R; 523/107

[58] Field of Search ...................... 526/264, 279, 258; 523/107; 351/160

[56] References Cited

U.S. PATENT DOCUMENTS

| 4,528,301 | 7/1985 | Upchurch | 523/107 |
|---|---|---|---|
| 4,594,401 | 6/1986 | Takahashi et al. | 523/107 |
| 4,616,045 | 10/1986 | Upchurch | 523/107 |

*Primary Examiner*—Joseph L. Schofer
*Assistant Examiner*—Alex H. Walker
*Attorney, Agent, or Firm*—Grant L. Hubbard

[57] ABSTRACT

Silymethylene methacrylate polymers and optical contact lenses fabricated therefrom are disclosed.

8 Claims, No Drawings

SILYMETHYLENE METHACRYLATE CONTACT LENS AND POLYMER

CROSS-REFERENCE TO RELATED APPLICATIONS

This is a division of co-pending application Ser. No. 061,477 filed on June 15, 1987, now U.S. Pat. No. 4,780,516.

This is a continuation-in-part of my copending application Ser. No. 742,122, filed June 5, 1985, now abandoned, which, in turn, is a continuation-in-part of then copending application Ser. No. 641,594, filed Aug. 17, 1984, now abandoned.

FIELD OF THE INVENTION

This invention relates to optical contact lenses and materials therefore and, in particular, to alkylsilane polymers and alkylsilane polymer contact lenses.

BACKGROUND OF THE INVENTION

Many polymeric materials have been evaluated for potential utility as contact lens material, but a very limited number of materials have been found to form contact lenses which are satisfactory. Advances in contact lens materials and techniques have come in small steps, which have been excruciatingly slow and difficult. Polymers and methods which appeared attractive have fallen by the wayside. The problems are myriad, and predictability is low. It is difficult and frequently impossible to predict optical quality, strength and flexibility, resistance to protein build-up, machining and fabrication characteristics, dimensional stability, oxygen permeability, and general biological compatibility. It is impossible to predict, or even to speculate as to possible optical, oxygen permeability, and biological characteristics of structural and industrial silanes such as disclosed by Campbell, U.S. Pat. No. 2,958,681 for example.

Reference is made to the literature, in texts, treatises and technical literature which describe silicon compounds, commonly referred to as silanes, particularly alkylsilanes. While the present invention departs from this chemistry in important and substantial ways, this body of chemistry is fundamental to the present invention.

Silane chemistry is quite well known and reported in the literature. An excellent treatment of the chemistry of silanes is given by Sommers, L. H.; Mitch, F. A.; and Goldberg, G. M., "Synthesis and properties of Compounds with a Framework of Alternatesilicon and Carbon Atoms," J.A.C.S., 71, 2746, (1949). Surveys of this body of chemistry are found in KIRK-OTHMER, ENCYCLOPEDIA OF CHEMICAL TECHNOLOGY, 3rd Ed. at Vol. 20, pp. 887-991. The chemistry of organosilicon compounds is described in ORGANOSILICON COMPOUNDS, Bazant, Chvalovsky and Rathovsky, Academic Press, Inc., New York, 1965.

Silanes have been utilized in preparative organic chemistry and for a number of specialty applications, including waterproofing compounds for mortar and fabrics and the like, as accelerators in some polymer operations, and as intermediates in the preparation of organosiloxanes.

Upchurch, U.S. Pat. Nos. 4,528,301 and 4,616,045 mention, inter alia, contact lenses of copolymers in which one monomer is selected from "a substituted polysiloxane such as dimethyl polysiloxane or a substituted silane" and refers to dimethyl, ethyl, phenyl, methoxy, vinyl, fluoropropyl, cyano, dimethyl-phenyl substituted silanes and mixtures of the same; however, this reference to silane monomers as constituents in contact lens polymers is apparently a shot in the dark. No examples of silane-containing contact lenses are given and it is not apparent from Upchurch, supra, that it would even be possible to prepare a silane-containing contact lens.

Takahashi, et al, U.S. Pat. No. 4,594,401 discloses contact lenses in which a substantial or major monomeric component in the polymer of which the lens is formed is trimethylsilylstyrene

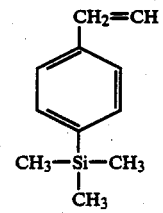

While Takahashi et al disclose an increase in oxygen permeability in lenses in which trimethylsilylstyrene is a major constituent, and suggest that a limited class of trimethylsilyl compounds, e.g. trimethylsilylmethyl methacrylate, trimethylsilylmethyl acrylate, trimethylsilylpropyl methacrylate, and trimethyl-silylpropyl acrylate may be substituted, there is no disclosure or suggestion of the use of more complex disylylemethylenes as lens polymer constituents. In view of the high level of uncertainty and lack of predictability vis-a-vis whether or not a given polymer can be made to form lenses, whether it will be transparent, have a suitable refractive index or hardness, etc., one cannot predict from the prior art whether or not silylmethylene methacrylate compounds may be incorporatted into polymers which will form suitable contact lenses.

SUMMARY OF THE INVENTION

The present invention relates to a novel class of contact lenses comprising polymers resulting from the polymerization or copolymerization of silylmethylenes having the general structure:

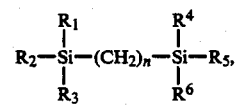

i.e. two or more silicon atoms chained together by one or more carbon atoms, n is a positive integer from 1 to 5, preferably 1 to 3 and wherein $R_1$ through $R_6$ are selected from the group consisting of methyl,

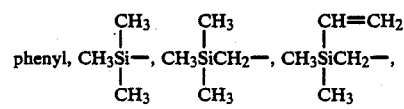

alkyloxy, phenylmethyl, and N-alkyl-pyrrolidinonyl, at least one of $R^1$ through $R^6$ comprising a polymerizable vinyl group selected from vinyl, allyl, acrylyl, acrylyl, methacrylyl, ethacrylyl, or styryl groups. (See Sommer et al, *supra*, for early disclosure of simpler examples of disilylmethylenes generally.)

Exemplary compounds include:

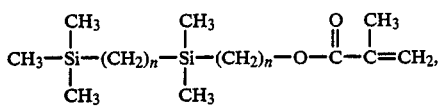

wherein n is a positive integer from 1 to 5, preferably 1 to 3;

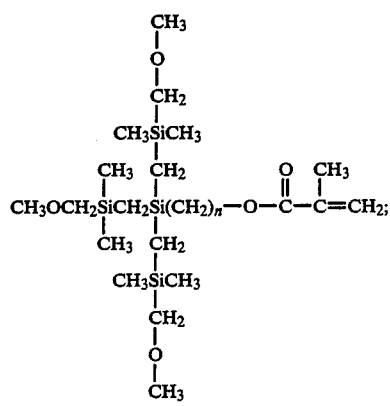

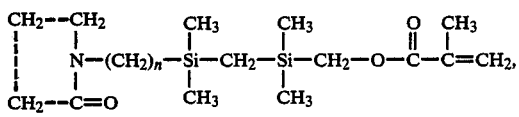

wherein n is a positive integer from 1 to 5, preferably 1 to 3;

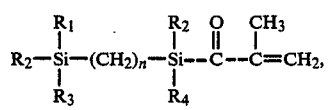

wherein n is a positive integer from 1 to 5, preferably 1 to 3 and R₁, R₂, R₃ and R₄ are selected from the group consisting of methyl, phenyl,

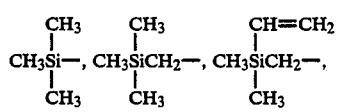

alkyloxy, phenylmethyl, and N-alkyl-pyrrolidinonyl;

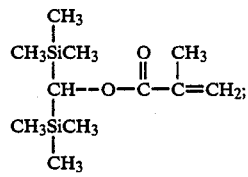

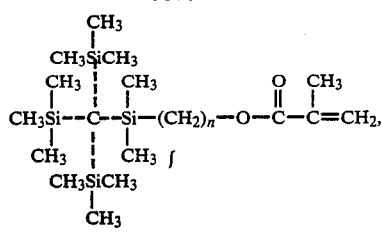

wherein n is a positive integer from 1 to 5, preferably 1 to 3;

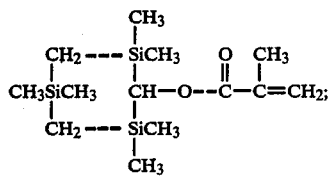

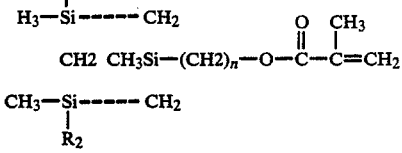

wherein n is a positive integer from 1 to 5, preferably 1 to 3 and R₁ and R₂ are selected from the group consisting of methyl, phenyl,

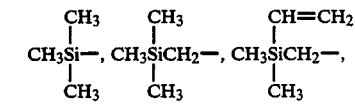

alkyloxy, phenylmethyl, and N-alkyl-pyrrolidinonyl;

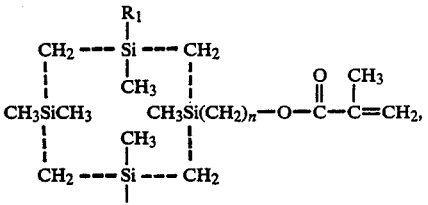

wherein n is a positive integer from 1 to 5, preferably 1 to 3 and R₁ and R₂ are selected from the group consisting of methyl,

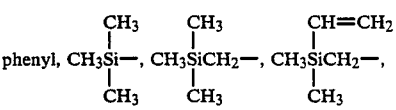

alkyloxy, phenylmethyl, and N-alkyl-pyrrolidinonyl;

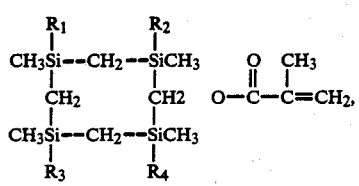

wherein n is a positive integer from 1 to 5, preferably 1 to 3 and $R_1$ through $R_4$, inclusive, are selected from the group consisting of methyl,

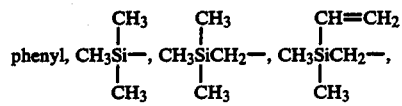

alkyloxy, phenylmethyl, and N-alkyl-pyrrolidinonyl;

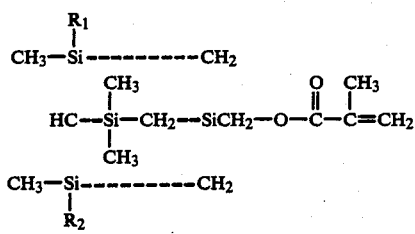

wherein n is a positive integer from 1 to 5, preferably 1 to 3 and $R_1$ and $R_2$ are selected from the group consisting of methyl,

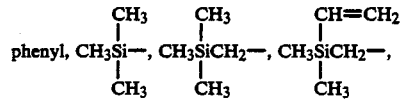

alkyloxy, phenylmethyl, and N-alkyl-pyrrolidinonyl. Silanes with two polymerizable groups and polymers thereof and lenses of such polymers are also contemplated within the scope of the invention. Exemplary of such monomers are:

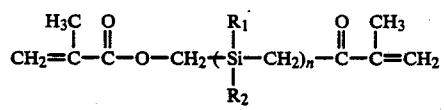

wherein n is a positive integer from 2 to 5, preferably 2 or 3 and $R_1$ and $R_2$ are selected from the group consisting of methyl,

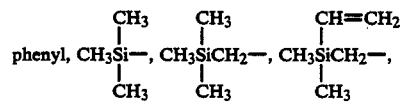

alkyloxy, phenylmethyl, and N-alkyl-pyrrolidinonyl;

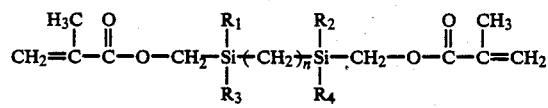

wherein n is a positive integer from 1 to 5, preferably 1 to 3 and $R_1$ through $R_4$, inclusive, are selected from the group consisting of methyl,

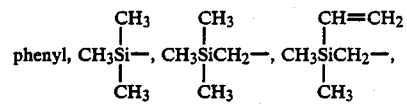

alkyloxy, phenylmethyl, and N-alkyl-pyrrolidinonyl;

A monomer which is predominantly silane, even though it includes the Si—O—Si linkage, is:

wherein n is a positive integer from 1 to 5, preferably 1 to 3, and $R_5$ to $R_8$, inclusive, are selected from the group consisting of

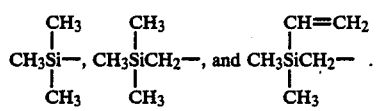

Other monomers which include two polymerizable groups include:

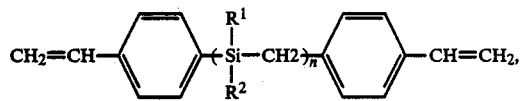

wherein n is a positive integer from 2 to 5, preferably 2 to 3 and $R_1$ and $R_2$ are selected from the group consisting of methyl,

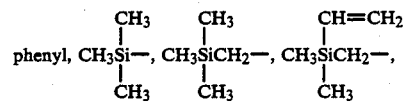

alkyloxy, phenylmethyl, and N-alkyl-pyrrolidinonyl;

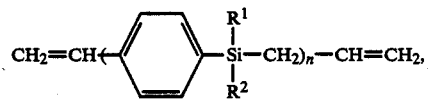

wherein n is a positive integer from 2 to 5, preferably 1 to 3 and $R_1$ and $R_2$ are selected from the group consisting of methyl,

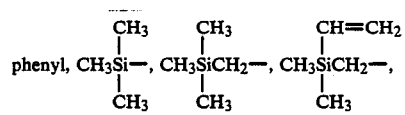

alkyloxy, phenylmethyl, and N-alkyl-pyrrolidinonyl;

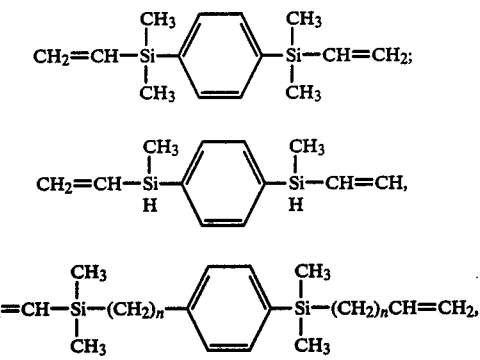

wherein n is a positive integer from 1 to 5, preferably 1 to 3;

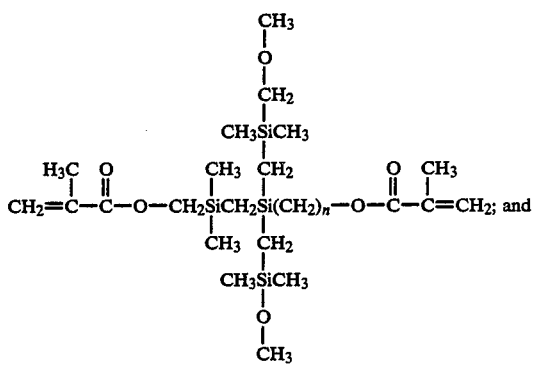

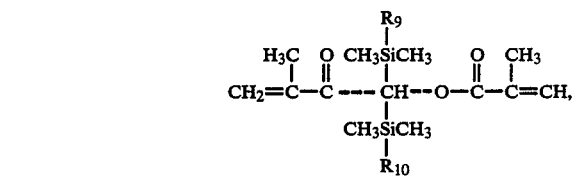

wherein $R_9$ and $R_{10}$ are selected from the group consisting of methyl, phenyl,

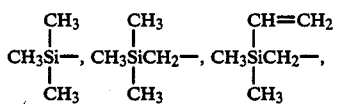

alkyloxy, phenylmethyl, and N-alkyl-pyrrolidinonyl.

In general, vinyl, allyl, acrylallyl, acrylic, methacrylic or ethacrylic derivatives of the compounds referred to which include one or more polymerizable groups such as vinyl, allyl, acrylic, methacrylic or ethacrylic may be considered equivalent to the specific, exemplary monomers, and polymers and copolymers of the same may be used as contact lens materials and lenses.

The silylmethylene methacrylate polymer lenses of this invention have been discovered to have extremely beneficial, and most unexpected and unpredictable properties as contact lenses. For example, the most comparable lenses, of siloxyl based polymers, have an oxygen permeability, Dk value (see, e.g. Fatt, I. and St. Helen, R., *Oxygen Tension Under an Oxybgen-Permeable Contact Lens*, American Journal of Optometry, July 1971, pp. 545–555, for a discussion of Dk values) in the 20's, the highest being about 30 to 32. The silylmethylene methacrylate polymer lenses of this invention have a calculated Dk value of as high as 40 or more! The extremely high Dk value, as shown by wearer comfort, has been demonstrated for the contact lenses of this invention. In addition, these silylmethylene methacrylate polymer lenses have an even greater resistance to protein contamination than the silicone and monosilane polymer lenses. These silylmethylene methacrylate polymer lenses are also harder and, very surprisingly, can be made wettable by inclusion of appropriate hydrophilic substituents much more easily than comparable silicone polymer contact lenses! These very surprising advantages, coupled with good optical quality, could not have been predicted or even guessed at in advance. These lens polymers can be formulated with a relatively high phenyl substituent content, giving lenses having a high index of refraction which can be made thinner and lighter than conventional contact lenses, and more easily fabricated into bifocal lenses than is possible with conventional and known lens polymers. Surface characteristics can be modified by inclusion of specific moieties in the polymer; for example, methoxy alkyl, ethoxy alkyl, or n-alkylpyrrolidinone may be included to improve wettability. Monomers having two polymerizable groups may be used, thus resulting in a fully crosslinked lens polymer. It is even possible to prepare highly hydrated lenses from the polymers of this invention!

DESCRIPTION OF THE PREFERRED EMBODIMENT

No new silane chemistry, per se, is involved in the present invention; rather, it has been discovered that silylmethylene methacrylate polymer contact lenses have most unexpected and unpredicted advantages over other lenses and, more particularly, over the most comparable lenses, those formed of silicone polymers.

The silylmethylene methacrylates used in forming the polymers from which the lenses of the present invention are manufactured are most conveniently prepared by the action of a polymerizable vinyl group containing moiety, e.g. methacrylic acid, on a chloroalkyl or bromoalkyl substituted silane, such as chloromethyl trimethylsilane or di-chloromethyl dimethylsilane, in the presence of a base such as pyridine or triethyl amine. The higher homologues of the series are conveniently prepared by the action of the Grignard Reagent of a silane, such as trimethylsilylmethyl magnesium chloride on a chlorosilyl-alkyl methacrylate, e.g. trichlorosilyl propyl methacrylate, to give tris(trimethylsilylmethyl) silyl-propyl methacrylate.

Lens Manufacture

The following general technique was followed in the preparation of lens blanks and lenses:

Monomers in the specified ratio and initiator were thoroughly mixed and dried over magnesium sulfate and filtered. The dried, filtered monomer mixture was placed in molds under nitrogen atmosphere and cured by slowly raising the temperature to about 100° C. for about 2 hours followed by a reduction to a post-cure temperature of about 15 hours. The resulting lens blank was examined and is then machined to form contact lenses according to conventional procedures for the manufacture of contact lenses.

The following examples of lenses formed by the technique described exemplify the invention.

EXAMPLE 1

| | |
|---|---|
| Phenyltetramethyldisilylmethylene-methylmethacrylate | 50% * |
| Methyl methacrylate | 38.5% |
| Methacrylic acid | 6% |
| Ethylene glycol dimethacrylate | 5% |
| N—vinylpyrrolidinone | 3% |
| Initiator** | (Trace) |
| Initial Cure Temperature | 100° C. |
| Initial Cure Time | 2 hours. |
| Post Cure Temperature | 82-83° C. |
| Post Cure Time | 17 hours. |
| Lens Qualities: | |
| Clarity | Excellent |
| Hardness | Good |
| Machinability | Good |
| Wettability | Good |
| Dimensional Stability | Excellent |

This lens material has an exceptionally high refractive index, making it ideally suited to the manufacture of bifocal and thin lenses.

These lens materials had excellent optical properties and some had outstanding refractive index characteristics. All were ideal for the manufacture of high quality exceptionally comfortable lenses. Some had moderate to high hydration capacity, in addition to being excellent, clear, comfortable lens characteristics.

One of the important discoveries of this invention is that these lens materials are far more comfortable for the wearer than the most nearly comparable lenses formed of siloxanyl polymers, the silicone polymers of the prior art and of my earlier filed copending patent applications. Wearer comfort is somewhat subjective but reflects real differences. Two objective observations are believed to explain the unexpectedly high comfort factor of the lenses of this invention. First, oxygen permeability is very high, thus contributing to healthier eye tissue and greater comfort. Second, these lens materials are exceptionally resistant to the buildup of proteins on the lens surfaces.

A third, highly unexpected, factor believed to contribute to wearer comfort is the wettability of the lens materials of this invention. Silanes have typically been used in waterproofing applications and one would predict a highly hydrophobic lens material. Quite surprisingly, however, the lenses of this invention are quite hydrophilic and, indeed, in some formulations, hydrate to a moderate to high level.

Another surprisingly characteristic of lens materials of the present invention is that it is possible to form excellent lens materials with excellent optical, refractive, mechanical and comfort properties without the presence of methyl methacrylate, or with only very minor amounts of methyl methacrylate.

It will be readily understood by those skilled in the art that the foregoing lens material formulations are only exemplary of a vast number of lens materials and lenses which can be manufactured within the scope of this invention. Many analogous and homologous monomers of the silane family may be substituted for those shown in the examples. Initiators may be selected from among the many which are suitable for initiating the polymerization of vinyl-group-containing monomers.

In general, the silylmethylene methacrylates of this invention comprise greater than 5% and preferably greater than 20% of the polymeric lenses and lens materials and may comprise up to about 95%, preferably up to about 90%, of such materials and lenses. In the preferred embodiment, the lens material is formed from the polymerization of polysilylmethyenes with a cross-linking monomer and a monomer, such as n-vinylpyrrol-idinone or hydroxyethyl methacrylate, or both, which contributes to the wettability or hydration of the lens, or to both wettability and hydration of lenses. This hydrophilic constituent may comprise, preferably, at least 2 to 3% and may comprise up to about 75% or more of the polymeric lens material.

Exemplary percentages of selected formulations are shown in the following table:

EXAMPLE 2

| | |
|---|---|
| Silylmethylene methacrylates | 5 to 95 weight % |
| Methyl methacrylate | 1 to 50 weight % |
| N—vinyl pyrrolidinone | 1 to 50 weight % |
| Methacrylic acid | 1 to 10 weight % |
| Ethylene glycol dimethacrylate | 1 to 10 weight % |

EXAMPLE 3

| | |
|---|---|
| Pentamethyldisylilmethylene-methyl methacrylate | (35 w/o) 3.5 g. |
| 2,2,2-Trifluoroetyl methacrylate | (54 w/o) 5.4 g. |
| Diethyleneglycol dimethacrylate | (5 w/o) 0.5 g. |
| Methacrylic acid | (6 w/o) 0.6 g. |
| Initiator | Trace |

EXAMPLE 4

| | |
|---|---|
| Phenyltetramethyldisylilmethylene-methyl methacrylate | (40 w/0) 4.0 g. |
| 2,2,2-Trifluoroetyl methacrylate | (50 w/o) 5.0 g. |
| Diethyleneglycol dimethacrylate | (4 w/o) 0.4 g. |
| Methacrylic acid | (6 w/o) 0.6 g. |
| Initiator | Trace |

As will be apparent from the above, the polymers and lenses of this invention comprise from five to ninety weight percent silylmethylene methacrylate, and preferably from about 15 w/o to 75 w/o disilylmethylene or one of the analogs thereof.

Polymer buttons formed pursuant to the description given using the example formulations resulted in clear, hard lenses when machined to lens configuration. The lenses were hard and easily formed, comfortable to wear and, especially the fluorine containing lenses, had a most unexpectedly high—five to six times better than comparable silicone and non-silane acrylic lenses. These lens materials have an exceptionally high refractive index, making it ideally suited to the manufacture of bifocal and thin lenses.

Typically, in the preferred embodiments, a hydrophilic monomer would also comprise the polymerization mix.

It has also been found advantageous to include methacrylic acid and/or methyl methacrylate as a monomer in the formation of the polymerized lens material; however, one of the surprising discoveries of this invention is that high quality lenses can be formed without either of these constituents.

Polymeric materials resulting from the polymerization or copolymerization of di-, tri- or other silylmethylene methacrylates of which several examples are given, and lenses formed therefrom are considered to be within the scope of this invention. Substituents on the basic polysilylmethyene structure may include hydrogen or alkyl, aryl, aralkyl, or silyl moieties, which may include vinyl, allyl, acrylyl, acrylic, methacrylic, ethacrylic, or pyrrolidinonyl substituents and may also contain up to about 35 weight percent siloxyl. The monomer includes at least vinyl polymerizable group containing moiety or equivalent, i.e. a polymerizable group which can be reacted polymerically without destruction of the polysilyl structure. The term "vinyl polymerizable group" is used here in a particular sense to mean a polymerizable group containing the carbon-carbon double bond which is polymerized in the formation of polyvinyl polymers, i.e. the following structures:

exemplary of which vinyl polymerizable groups are: vinyl, allyl, acrylyl, acrylyl, methacrylyl, or styryl.

In general, vinyl, allyl, acrylallyl, acrylic, methacrylic or ethacrylic derivatives of the compounds referred to which include one or more polymerizable groups such as vinyl, allyl, acrylic, methacrylic or ethacrylic may be considered specific, exemplary monomers, and polymers and copolymers of the same may be used as contact lens materials and lenses.

Industrial Application

This invention is useful in the optical industry and, particularly, in the manufacture of optical contact lenses for the correction of certain human vision defects.

What is claimed is:

1. A contact lens comprising polymer resulting from the polymerization or copolymerization of silylmethylenes, having the general structure

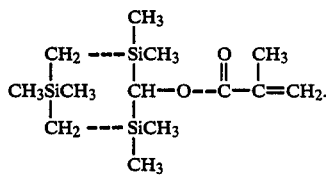

2. A contact lens comprising polymer resulting from the polymerization or copolymerization of silylmethylenes, having the general structure

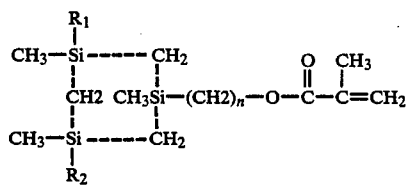

wherein n is a positive integer from 1 to 5 and R₁ and R₂ are selected from the group consisting of methyl,

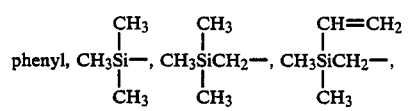

alkyloxy, phenylmethyl, and N-alkyl-pyrrolidinonyl.

3. A contact lens comprising polymer resulting from the polymerization or copolymerization of silylmethylenes, having the general structure

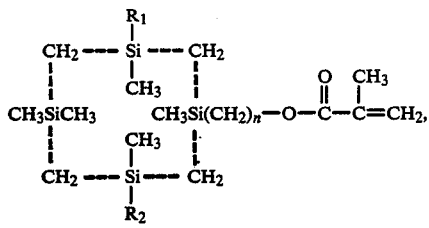

wherein n is a positive integer from 1 to 5 and R₁ and R₂ are selected from the group consisting of methyl,

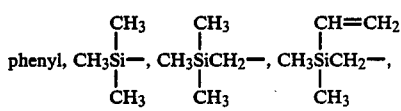

alkyloxy, phenylmethyl, and N-alkyl-pyrrolidinonyl.

4. A contact lens comprising polymer resulting from the polymerization or copolymerization of silylmethylenes, having the general structure

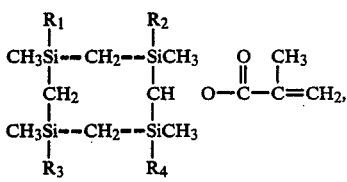

wherein n is a positive integer from 1 to 5 and R₁ through R₄, inclusive, are selected from the group consisting of methyl,

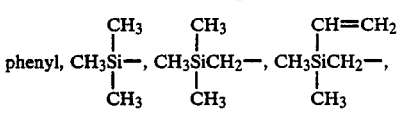

alkyloxy, phenylmethyl, and N-alkyl-pyrrolidinonyl.

5. A contact lens comprising polymer resulting from the polymerization or copolymerization of silylmethylenes, having the general structure

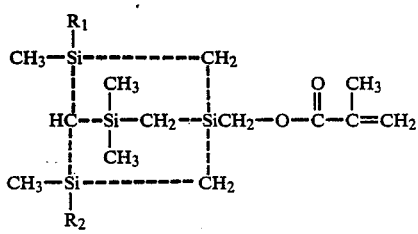

wherein n is a positive integer from 1 to 5 and R₁ and R₂ are selected from the group consisting of methyl, phenyl, 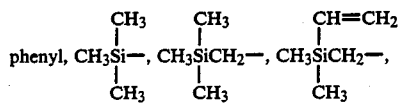

alkyloxy, phenylmethyl, and N-alkyl-pyrrolidinonyl.

6. A contact lens comprising polymer resulting from the polymerization or copolymerization of silylmethylenes, having the general structure

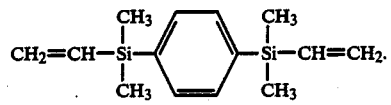

7. A contact lens comprising polymer resulting from the polymerization or copolymerization of silylmethylenes, having the general structure

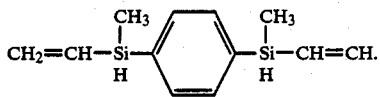

8. A contact lens comprising polymer resulting from the polymerization or copolymerization of silylmethylenes, having the general structure

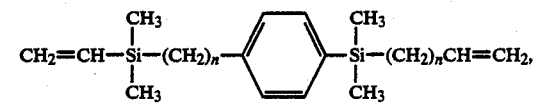

wherein n is a positive integer from 1 to 5.

* * * * *